United States Patent [19]

Burckhardt et al.

[11] Patent Number: 4,702,337

[45] Date of Patent: Oct. 27, 1987

[54] CONTROL SYSTEM FOR AN AUTOMATIC ALL WHEEL DRIVE VEHICLE

[75] Inventors: Manfred Burckhardt, Waiblingen; Richard Zimmer, Fellbach, both of Fed. Rep. of Germany

[73] Assignee: Daimler-Benz Aktiengesellschaft, Stuttgart, Fed. Rep. of Germany

[21] Appl. No.: 917,610

[22] Filed: Oct. 10, 1986

[30] Foreign Application Priority Data

Oct. 10, 1985 [DE] Fed. Rep. of Germany ....... 3536185

[51] Int. Cl.⁴ .............................................. B60R 17/34
[52] U.S. Cl. .................................... 180/197; 180/249
[58] Field of Search ................ 180/197, 247, 248, 249

[56] References Cited

U.S. PATENT DOCUMENTS

| | | | |
|---|---|---|---|
| 3,802,529 | 4/1974 | Burckhardt et al. | 180/197 |
| 4,484,653 | 11/1984 | Horikoshi | 180/197 |
| 4,552,241 | 11/1985 | Suzoki | 180/249 |
| 4,558,414 | 12/1985 | Sakakiyama | 180/197 |

Primary Examiner—John J. Love
Assistant Examiner—Donn McGiehan
Attorney, Agent, or Firm—Barnes & Thornburg

[57] ABSTRACT

A reference signal generation circuit for providing a vehicle reference speed signal to an antilocking system in a vehicle having automatic selectable all wheel drive is provided. A reference signal generator is put into various operational states to increase, decrease or hold the reference signal in response to various operating conditions of the vehicle and the road conditions, in order to provide a more accurate vehicle reference speed signal to the antilocking control system, even when the vehicle wheels are spinning.

17 Claims, 3 Drawing Figures

CONTROL SYSTEM FOR AN AUTOMATIC ALL WHEEL DRIVE VEHICLE

BACKGROUND AND SUMMARY OF THE INVENTION

The invention relates to a process for generating a reference signal, which reproduces the vehicle speed, in a vehicle with automatically selectable two and four wheel drive and having an antilocking control system, as well as an arrangement for carrying out this process.

In the unpublished German Patent Application No. 3,505,455 (which corresponds to U.S. patent application Ser. No. 828,275 filed on Feb. 11, 1986 and assigned to the assignee of the present invention), an apparatus, and indirectly also a process, is described for a boost control system in a vehicle. This system operates to switch from a single axle to a two axle drive as soon as the drive slip of a permanently driven vehicle wheel exceeds a predetermined threshold value. In this manner, the traction of the vehicle is significantly improved, particularly when it is moving on a road with relatively low traction coefficients between the road and the driven vehicle wheels. This also applies to vehicles which are equipped with a permanent four wheel drive, as described, for example, in German Unexamined Patent Application No. 34 26 747, also not published, and in Automobiltechnische Zeitschrift, Journal for Automobile Engineering, Vol. 87, September 1985, pages 395–400. In such vehicles, which exhibit high traction even on roads with poor subsoils, it is very important to also optimize the brake system in the sense of good deceleration and driving stability so that the vehicle remains controllable in every operating situation, either acceleration or deceleration.

However, the combination of a four wheel drive with an antilocking system, as known, for example, through U.S. Pat. No. 3,950,036 or German Published Unexamined Patent Application No. 2,951,754 for vehicles with one axle drive, proves to be problematic at closer inspection. In such antilocking systems, the information about whether a decelerated vehicle has a tendency to lock, that means runs into an excessive brake slip, is obtained from the comparison of its actual circumferential speed, provided via wheel sensors, with a reference speed. This reference speed is taken as the measure for the vehicle speed and is supposed to represent the vehicle speed as closely as possible. In this process the following control algorithm is applicable: If the wheel speed is lower than the reference speed by more than a predetermined threshold value, the wheel is considered to be decelerated too much. The control electronics of the antilocking system then generates a pressure decrease signal to drive the brake pressure control valve by means of which the brake pressure is decreased in the wheel brake. In the conventional method, the brake pressure is decreased at this wheel until the wheel is accelerated again. This state is indicated by the fall of the characteristic ($-b$) signal for the deceleration of the wheel.

The brake pressure is then held constant at this wheel. For approximating the reference speed, the switch is once again made to pressure decrease, provided the wheel is not accelerated again. If, on the other hand, the wheel is accelerated, the switch is made to pressure increase as soon as the wheel speed is different from the reference speed by less than a threshold value. The object of this control is to hold the brake slip of the vehicle wheels within the range of values that are compatible with good driving stability and good deceleration.

In the antilocking system of U.S. Pat. No. 3,950,036, at the start of deceleration, the speed of the least decelerated wheel is taken as the reference speed. The decrease in the reference speed is limited to the value $-g$ ($g=9.81$ m/s$^2$), as long as the reference speed is larger than the speed of all vehicle wheels. The reference speed is held constant if it is between the speeds of the fastest and the second fastest vehicle wheel. Moreover, the reference speed is the speed of the second fastest vehicle wheel, if at least one of the two fastest vehicle wheels is not driven, or the third fastest vehicle wheel, if the two fastest vehicle wheels are the driven vehicle wheels. Thus, the reference speed is limited "upward" by the speed of the slower of the non-driven vehicle wheels, whereas the decrease is limited by the value $-g$ (cf. column 7, lines 20 to 48 of U.S. Pat. No. 3,950,036).

In the antilocking system shown in U.S. Pat. No. 3,950,036, only one single reference speed is produced with which the wheel circumferential speeds of all of the vehicle wheels are compared.

In contrast to this, in the antilocking system shown in German Published Unexamined Patent Application No. 2,951,754, a reference speed is produced for each vehicle wheel subjected to the antilocking system. This reference speed corresponds to a weighted average value of the wheel speeds of all lf the vehicle wheels. In generating the average value, the largest weight is given to the vehicle wheel for which the aforementioned reference speed is generated. In addition to this, the non-driven vehicle wheels, having a higher weighting, enter into the formulation of the average value as the driven wheels (cf. page 11, par. 1 of the German Published Unexamined Patent Application No. 2,951,754). Moreover, in that German reference, which agrees with U.S. Pat. No. 3,950,036, it is proposed that the reduction in reference speeds be limited to a maximum fixed value. In generating the reference speed assigned to the individual vehicle wheels, adequate consideration should be given to the fact that on a road having a number of curves, the individual vehicle wheels generally roll along different radiis of the curve and thus their circumferential speeds should also be compared with different vehicle speeds. Further, the process disclosed by the German Published Unexamined Patent Application No. 2,951,754 for generating different reference speeds for individual vehicle wheels, is different from the process disclosed by U.S. Pat. No. 3,950,036 for generating a reference speed, which is regarded as representative for the entire vehicle. This is due to the fact that the maximum value of the reference speed(s) in the extreme case corresponds to the greatest wheel speed possible with which the vehicle wheels can spin.

However, both known antilocking systems have in common that at the start of the control phase, the standard reference speed agrees or nearly agrees with the amount of a wheel speed obtained at that time.

This is not a problem provided the reference speeds that are the determining factors at the start of the control process can be obtained from wheel speeds of non-driven vehicle wheels, as is the case in the two aforementioned explained antilocking systems, since these wheel speeds usually give a good approximation of the vehicle speed.

However, this does not apply to vehicles with a permanent four wheel drive or one that is only periodically switched on, since in such vehicles it is possible to have operating situations in which all of the vehicle wheels spin uniformly. In that case, there no longer exists a definite relationship between the vehicle speed and the wheel circumferential speed. A typical situation of this nature is, for example, uphill driving on a road having a uniformly low traction coefficient between the road and the vehicle wheels. In such a situation it is possible for the vehicle to move with significantly less speed than the circumferential speed of the driven vehicle wheels. And in the extreme case it might even occur that the vehicle slides backwards even though all of the vehicle wheels are driven in the forward direction and thus spin at a high speed.

Such a situation can only be controlled by activating the brake if the brake system responds directly after its activation, as is the case, for example, in a brake system without an antilocking system. If the vehicle, however, is equipped with an antilocking system of the type described above, a non-actual high speed value by which a corresponding high vehicle speed is approximated, is applied as the reference speed for the antilocking control system if the brake is activated. The antilocking system responds immediately after the start of deceleration, since the vehicle wheels, spinning up to that time on a smooth subsoil, are decelerated very quickly, so that the wheel decelerations can be significantly larger than the rate of change of 1g anticipated for the reduction of the reference speed. This rate of change corresponds to the maximum value of the vehicle deceleration which may be obtained under good road conditions.

The antilocking control system responds to the high values of the wheel decelerations and/or to the difference between the wheel speeds and the respective reference speed, this difference having set in after a short period of time and being already too large. Since the wheel speeds fall far below the reference speed, a very high brake slip value is generated by the antilocking system with the result that the control system reacts by decreasing the pressure in the wheel brakes. The brake system is practically out of action. This state continues until the reference speed at this limited rate of change has dropped so far that the antilocking control system again "sees" equivalence of the reference speed and the wheel speed. This combination corresponds with an increase in the brake pressure and triggers the build-up in its pressure increase position by switching back the brake pressure control valve.

In order to prevent such a "failure mode" of the antilocking system in a vehicle with permanent all wheel drive, in the ATZ Sept. 9, 1985, pages 395 to 400, (in particular page 400, line 5,) it is proposed that the longitudinal deceleration in the vehicle be detected in order to be able to obtain information regarding the friction level between the road and the vehicle wheels and the criteria for adequately controlling the brake pressure. However, the longitudinal acceleration sensor required for this detection has, by definition, the disadvantage that it also reacts to the rise and fall of the road. This, in turn, undesirably results in an antilocking control system having control characteristics which vary widely and are dependent on the road condition.

In a vehicle, having automatic selectable all wheel drive, as described in German Published Unexamined Patent Application No. 3,505,455, or in a vehicle, generally having a permanent all wheel drive or an all wheel drive that can be at least partially switched off, as described in the German Published Unexamined Patent Application No. 3,426,747, theoretically the above-described "failure mode" of an antilocking control system could be prevented by carrying out test cycles. These test cycles would involve periodically switching the all wheel drive off, for short time spans. In the course of these tests the non-driven vehicle wheels can assume the actual vehicle speed, which is used as a supporting value for adjusting the reference speed. In principle it would be possible to accurately adjust the reference speed to the actual vehicle speed. Such a measure, however, would result in a most uncomfortable, vibration-like acceleration and deceleration behavior of the vehicle due to the constant switchover from one axle to two axle drive and vice versa, which is required for the adjustment of the reference speed. Such behavior would reduce the utility of the all wheel drive and would not be acceptable.

Thus, an object of the present invention is to provide in a vehicle, which is equipped with an automatically selectable all wheel drive and an antilocking system which operates according to a conventional control system logic, dependent on the threshold values of the wheel decelerations of the brake slip, an arrangement which provides not only a fast response of the brake system in decelerating the vehicle wheels but also guarantees the maintenance of the antilocking control function. The invention also provides a process carried out by the arrangement for providing the functions listed above.

The objects of the present invention are attained by providing a process in which a reference signal is generated in which the reference signal is increased at a rate which is limited by a predetermined threshold rate if both axles are drive coupled via the longitudinal differential and the wheel speed signals increase faster than the threshold rate. In certain preferred embodiments, the process also includes the steps of: keeping the reference signal at a maximum value attained by the reference signal during a process of locking the longitudinal differential; periodically uncoupling an axle from a power train of the vehicle for a test cycle, and increasing the reference signal at a predetermined test cycle rate if the largest of the wheel speed signals is greater than the reference signal; and reducing the reference signal down to the largest wheel speed signal if the reference signal is greater than the largest speed signal.

Accordingly, in an operating state in which the all wheel drive is already switched on, but the longitudinal differential of the power train is not yet locked, as well as in the course of the test cycles, which are conducted to detect possible differences between the reference speed and the vehicle speed, the reference speed is adjusted to the highest speed of the wheel circumferential speeds at an increased rate of change. For the duration of the operating states of the vehicle in which the longitudinal differential of the power train is locked, the reference speed is restricted. The value of the reference speed at the time the longitudinal differential lock was switched on serves as the upper limit. In driving situations in which the vehicle is driving on a "poor" subsoil so that there is a low traction coefficient between the road and the driven vehicle wheels, this upper limit prevents the reference speed from rising to unrealistically high values.

By quickly adjusting the reference speed signal to the highest of the wheel speeds, it is possible to maintain the antilocking control function in practically all relevant cases, if the reference speed is larger than the highest speed of the wheel speeds when the antilocking control system sets in. The antilocking function, in turn, should be able to decelerate the vehicle. On the whole, for the statistically significant driving and decelerating situations, the present invention makes it possible for the braking system to respond adequately fast after its activation and to allow deceleration with the use of the antilocking control functions.

In preferred embodiments of the process, by matching the reference signal to the wheel speed signal after a delay time within which the vehicle wheels attain operating speed, the reduction in the reference signals, resulting from an antilocking controlled deceleration, results in the reference speed signal being quite accurately adjusted to the vehicle speed.

In a further preferred embodiment of the process, the duration of a delay time span of between 80 to 200 milliseconds has been ascertained by systemic tests as particularly advantageous. When the time span has ended, the non-driven vehicle wheels assume with high probability the vehicle speed.

In a still further preferred embodiment of the process, a favorable rate of change for adjusting the reference speed to the wheel speed when the reference signal is matched to the largest speed signal following the time delay is at least $-80$ m/s$^2$. This rate of change can be realized by way of simple means in the digital electronic circuit technology.

By providing a reference speed signal that is changed incrementally, in certain preferred embodiments a realistic reproduction of the vehicle speed through the reference speed, in particular, when driving uphill with low traction coefficients between the road and the driven vehicle wheels, is attained.

The arrangement for carrying out this process has an all wheel drive control for placing the vehicle in an all wheel drive mode and locking the longitudinal differential, and an antilocking control system. A reference signal generator produces a reference signal and is controlled by three operational state controllers to cause the reference signal generator to either increase, decrease or hold the reference signal produced depending on detected conditions.

An advantageous feature of the arrangement is the simple electronic switching arrangement for the logical switching of output signals of the electronic control units of the antilocking system and the drive control for the comparison of the reference speed, generated in the manner of the invention, with the wheel speeds of the vehicle, as well as for a time delayed adjustment of the reference speed to the wheel speed. The specific arrangement could also be designed as auxiliary switching units for conventional control units for all the wheel drive control system and the antilocking control system.

These and other objects, features, and advantages of the present invention will become more apparent from the following description when taken with the accompanying drawings which show, for purposes of illustration only, one embodiment in accordance with the present invention.

DETAILED DESCRIPTION OF THE DRAWINGS

Figure 1:
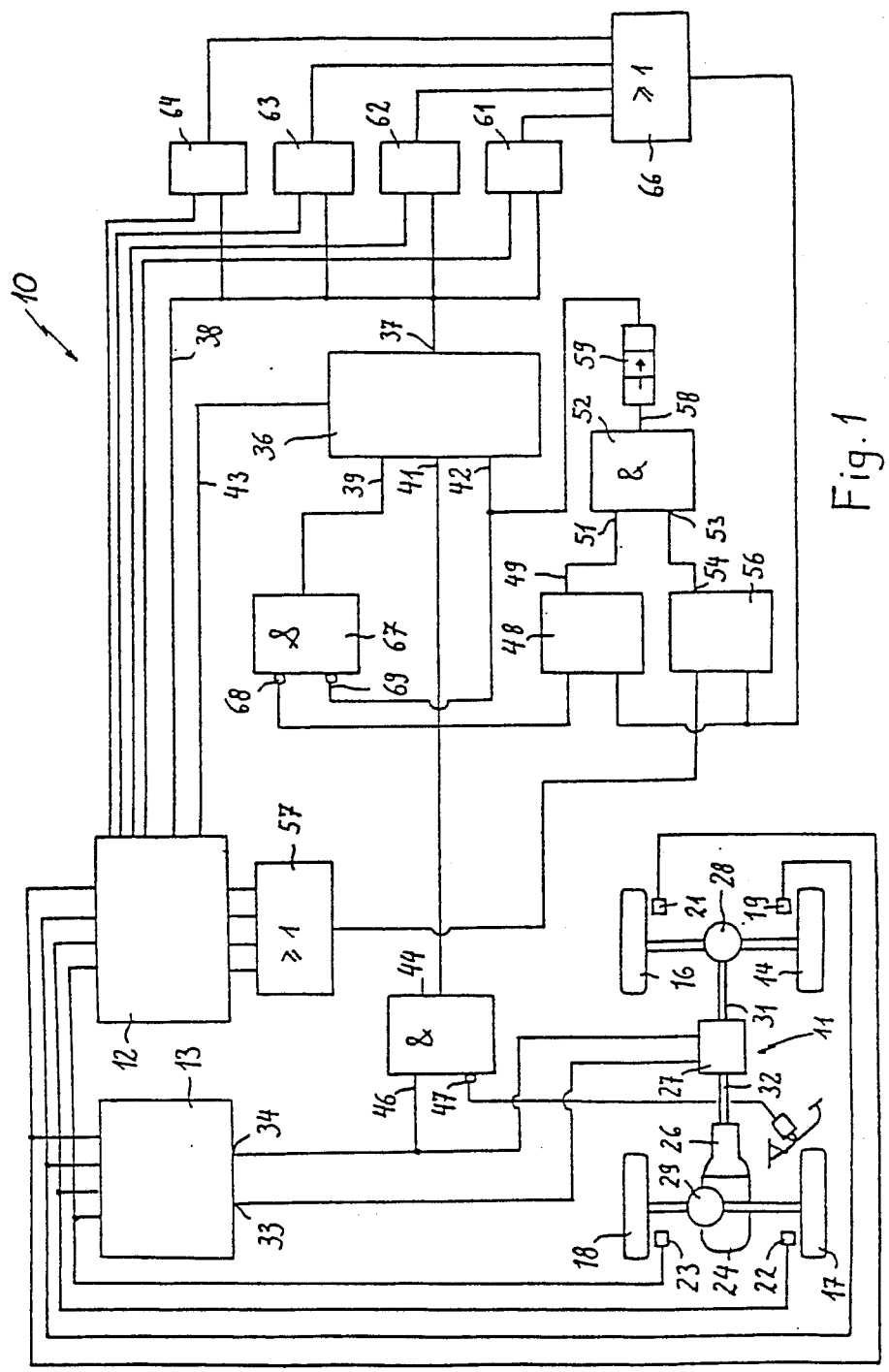
FIG. 1 is a schematic block diagram of a preferred embodiment of the present invention.

FIG. 1 shows the operational elements of an apparatus constructed in accordance with a preferred embodiment of the present invention, and has the reference numeral 10. The apparatus 10 provides a reference speed to an antilocking system representative of the speed of a vehicle 11 with automatically selectable two and four wheel drive. The electronic control unit 12 of an antilocking system (not shown in detail), with which the vehicle is also equipped and which is of conventional design, generates the values of the brake slip when decelerating based on the provided reference speed. The brake slip values are used by the antilocking control system for producing adjusted brake pressure control signals, stopping control signals, decrease in brake pressure control signals and increase in brake pressure control signals.

Vehicle 11 is represented in FIG. 1 by its automatic all wheel power train, which is shown only schematically. By the term "automatic all wheel drive," it is to be understood that the electronically controlled vehicle can be shifted from a permanent one axle drive, either rear axle drive or front axle drive, to two axle drive or from two axle drive to one axle drive. The necessary control signals are produced by an electronic control unit 13 of the all wheel drive. The control unit 13 produces these control signals from the output signals received from the wheel speed sensors 19 and 21 or 22 and 23, assigned to each of the rear wheels 14 and 16 and the front wheels 17 and 18 of the vehicle 11. The output signals from the wheel speed sensors 19, 21–23 are proportional to the individual wheel speeds.

In the following description, it is assumed for the sake of clarity, that the vehicle 11 has permanent rear axle drive and that it is the front axle drive that can be switched on and off. The initial torque, which can be graduated by a gear shift 26 and generated by a drive motor 24, is coupled in the power train either only on the rear axle or divided on the rear axle and the front axle via a distributor gear 27. This distributor gear is termed the longitudinal differential 27 in the following and can be controlled into various operational states by electronic control output signals of the electronic all wheel drive unit 13. An electrically controlled, lockable rear axle differential 28 and/or front axle differential 29 are provided for distributing the torque on the wheels 14 and 16 of the rear axle and/or the wheels 17 and 18 of the front axle. These differentials 28, 29 are coupled to the longitudinal differential 27 by articulated shafts 31 and 32.

In normal one axle drive state, the longitudinal differential 27 connects only the drive coupling of the rear axle differential 28 with the output shaft of the gearshift transmission 26. The longitudinal differential 27 is placed into an operational state in which the front axle and the rear axle of the vehicle are drive coupled and the longitudinal differential 27 acts as the compensating gear, by a control signal from a first control output 33 of the electronic all wheel control unit 13. The longitudinal differential 27 is controlled by a second control signal into its locked state in which the articulated shafts 31 and 32, connecting the drive coupling of the rear axle and the front axle, to rotate at the same speed. This control signal is a high level signal from the second output 34 of the all wheel control unit 13, and is an alternative to the first control signal. The rear axle differential 28 and the front axle differential 29 can be placed either together or alternately into their locked states by further control signals delivered from control outputs of the all wheel control unit 13, which are not shown in detail. The longitudinal differential 27 and/or the rear axle differential 28 and the front axle differential are activated or locked according to the following criteria:

Only the rear wheels 14 and 16 are being driven at first, in this example. If the all wheel control unit 13 recognizes from the processing of the output signals of the wheel speed sensors 19, 21-23 that at least one of the rear wheels 14 or 16 exhibits the tendency to spin, the longitudinal differential 27 is placed into the all wheel operating state by a first control signal from the first control output 33 to act as a axle to axle differential. If the tendency to keep spinning is not decreased and/or the spinning tendency does not occur at the other vehicle wheels, the longitudinal differential 27 is placed into the locked state by a second control signal from the second output 34 of the all wheel control unit 13.

All the wheels 14, 16-18 are now being driven. If the tendency to spin continues at one or more of the wheels, the rear axle differential 28 and, if necessary, also the front axle differential 29 are placed into their locked operational state in succession by further control output signals of the all wheel control unit 13.

It is assumed that the automatic all wheel drive of the vehicle 11, as has been explained above, is well-known in its structure and function by those skilled in the art. This applies also to the antilocking system of the vehicle 11 of which only the electronic control unit 12, is shown in FIG. 1.

The antilocking control unit 12 generates characteristic signals regarding the characteristics of wheel circumferential speed, wheel deceleration (−b) or acceleration (+b) at the individual wheels respectively from the processing of the output signals of the wheel speed sensors 19, 21, 22 and 23. When the brakes of the vehicle 11 are activated, the antilocking control unit 12 produces characteristic signals internally for the values of the brake slip at the individual vehicle wheels 14, 16-18. These characteristic signals are obtained by comparing the wheel circumferential speeds with a reference speed, generated internally by the control unit 12 and assumed to be representative of the vehicle speed. From a comparison of the characteristic signals of wheel acceleration/deceleration and brake slip with threshold values therefor, the electronic control unit 12 of the antilocking system generates control signals required for controlling brake pressure control valves. The brake pressure control valves are controlled as required into pressure hold and pressure descrease positions, and/or remain in their basic positions, corresponding to a pressure build-up function. In a typical design, an antilocking system works as follows:

During controlled deceleration, if the deceleration of the wheels exceeds a threshold value of $(-b_1)=14$ m/s$^2$, for example, the brake pressure is decreased at this wheel. If the wheel, which previously was decelerated, is accelerated again and exceeds a threshold value $(+b_1)$ of approximately 3 m/s$^2$, the corresponding brake pressure control valve is placed into its pressure hold position. The corresponding brake pressure control valve is placed back into its pressure build-up position if the wheel acceleration exceeds a threshold value $(+b_2)$ of approximately 100 m/s$^2$. If the deceleration $(-b_1)$ limit is not exceeded when braking with moderate brake pressure, but the brake slip continues to increase, the switch is made to pulsating pressure decrease when the threshold value 1 of 0.15, for example, is exceeded and to decrease in brake pressure when a second, higher brake slip threshold value 2 of 0.25, for example, is exceeded. This assumes that the characteristic signals that are generated for brake slip are the result of the relationship $(V_{ref}-V_R)/V_{ref}$, wherein is the reference speed and $V_R$ is the circumferential speed of the wheel subjected to the antilocking control system and under consideration here.

As long as vehicle 11 has only a one axle drive, a value for the reference speed that is a good approximation of the speed of the vehicle can be generated. In this case, the value given at the start of the deceleration, for the circumferential speeds of the wheels that are not driven, is available as the initial value for the reference speed. The reference speed is to be generated at the latest with the usage of the antilocking control system. Starting with the circumferential speed, it is possible to obtain a course of time for the reference speed by continuous, either incremental or constant, lowering at a rate of usually −3 m/s$^2$. By means of this reference speed the real course of time for the speed of the vehicle can be given with good approximation, which is adequate for most needs.

If, however, the all wheel drive is switched on and the longitudinal differential 27 is locked, none of the wheel circumferential speeds given at the start of an antilocking control process may be used as initial supporting values for generating a suitable reference speed, since now there is the possibility that all the wheels of the vehicle are driven simultaneously.

As explained in the introduction, one solution to this problem in known vehicles with automatic all wheel drive and with an antilocking system was to continuously increase the reference speed and, in particular, at a moderate rate of approximately 2 m/s$^2$ when shifting into all wheel drive or at the latest when locking the longitudinal differential. In order to monitor the reference speed, it was hypothesized to conduct a test cycle after a typical time span of 6 seconds. For this purpose, a shift is made from all wheel drive to one axle drive for a short time span of approximately 50 milliseconds. The duration of the test cycle is measured so that the wheels that are not driven can assume the speed of the vehicle. If the reference speed, which is linearly increased over time, is larger than the highest of the circumferential speeds of the front wheels at the end of the test cycle, the reference speed is set at this highest value.

If the vehicle is decelerated, the reference speed is decreased at a constant rate, whose typical value is −3 m/s$^2$, when there is a deceleration siqnal of the all wheel control unit 13 or the (−b) signal of the antilocking control unit 12 is high, indicating that a minimum threshold value $(-b_1)$ of the wheel deceleration is either reached or exceeded. If the deceleration starts immediately before a test cycle would have ended, which is at a point in time at which the reference signal has been increased at 2 m/s² for approximately 6 seconds and the frictional coefficient between the road and the vehicle wheels is low, then not only the wheel deceleration but also the brake slip attains very high values immediately after the start of deceleration. Therefore, the wheel deceleration and the brake slip will generate signals, and indicate the (−b) signal and/or the surpassing of the slip threshold value, in the antilocking control unit 12. The antilocking system will shift after a short period of time to decreasing the pressure in the wheel brakes of the deceleration and slip loaded wheels, so that deceleration is disrupted. Since the wheel speeds, as detected by the wheel speed sensors can, in this case, fall drastically below the reference speed, which is lowered only at the moderate rate of −3 m/s², the brake slip signals, which control the pressure decrease function and which are generated in relation to the "slowly" decreasing reference speed, are delayed a long time. This causes the wheel brakes, during the deceleration of the wheels that are subjected to the control system, to remain without pressure for a correspondingly long period of time. Thus, the vehicle cannot be decelerated in the situation that has been described above but which statistically does not occur very often when driving.

It is the purpose of the apparatus 10, shown in FIG. 1, to exclude with high probability such situations, which have an extremely high potential for risk.

The design and function of the switching and operational elements, which are provided in addition to the known components of the all wheel operating control and antilocking systems, are explained in detail in the following and in FIGS. 1-3.

The central operational unit of the apparatus 10 is a reference signal generator 36, which supplements the electronic control unit 12 of the antilocking system. At output 37, the reference signal generator 36 outputs electrical signals representing the reference speed and these are provided to the antilocking control unit 12 via signalling wire 38. The antilocking control unit 12 generates the characteristic signals for the brake slip, with reference to these reference speed elecrical signals which are generated in either digital or analog format suitable for processing in the antilocking control unit 12.

The reference signal generator 36 can be controlled into three operational states by control signals which are routed to at least one of three control inputs 39, 41 or 42. In the first operational state of the reference signal generator 36 when there is a continuous high level control signal at the first control input 39, the generator 36 acts only as a feedback circuit for monitoring the antilocking control unit 12. The reference signal generator 36 receives via signaling wire 43 and outputs via a signaling wire 38 to a processing stage, not shown in detail, of the control unit 12, signals that are characteristic of the brake slip, thereby providing automatic feedback.

In the first operating state, which can be labeled the "normal operating state," the antilocking system works analogous to the antilocking system of a vehicle with one axle drive. Thus, the reference speed is primarily increased or decreased with the circumferential speeds of the vehicle wheels that are not driven. However, the increase in the reference speed is limited to a maximum value of approximately 4 m/s², in contrast to typical antilocking systems for vehicles having one axle drive, in which an increase in the reference speed is usually lmited to 2 m/s². The reference signal generator 36 is also operated in its normal operating state if all wheel drive is switched on and the longitudinal differential 27 is not locked. The reference speed is then decreased or increased with the highest of the wheel circumferential speeds.

The reference signal generator 36 is controlled into its second operational state by a continuous high level control signal at it's control input 41. In this state, the reference speed values generated by the reference signal generator 36, are held either constant at the value of the reference speed in the second operational state during transition or, starting with this value, is gradually lowered at an average reduction rate of 1 to 2 m/s², if necessary, down to the value 0.

The condition required for triggering the reference signal generator 36 into its second operation state is the locking of the longitudinal differential 27 into all wheel drive in a non-decelerated vehicle 11. Accordingly, a first two input AND gate 44 is provided for generating the logical 1 that drives the reference signal generator 36 into its second operational state. This AND gate 44 has a non-negated input 46, which is connected to the second control output 34 of the all wheel drive control unit 13, which outputs a logic 1 when the longitudinal differential 27 is locked. It also has a negated input 47 from the brake light switch output signal, so that a logic 1 is present at negated input 47 only if the brake is activated.

At the decreasing edge of the high level output signal of the first AND gate 44, a first flip flop 48 is set at a logical 1 at its output 49, which is connected to one non-negated input 51 of a second, two input AND gate 52 to which a second flip flop 56 is also connected.

This second flip flop 56 can also be set at a logic 1 at its output 54 by the falling edge of a signal. This signal from the output of a first, four-input OR member 57 is high (a logical 1) if in the course of deceleration of the vehicle, the (−b) signal is generated for at least one of the decelerated vehicle wheels 14, 16, 17 or 18, which indicates that at this vehicle wheel the critical deceleration threshold value has been exceeded. This (−b) signal, according to the control algorithm, and as explained in the introduction, is used to control the brake pressure decrease or the brake pressure hold phase.

The output 58 of AND gate 52 is connected via time delay gate 59, which provides a rise delay within the range of 80 to 200 milliseconds, and is preferably 100 milliseconds, to the third control input 42 of the reference signal generator 36. The generator 36 is thus controlled by the time delay gate 59 into its third operational state at the start of the output signal of the AND gate 52. In this third state, starting from the reference speed value that is available when the time level signal of the time delay gate 59 is inputed to generator 36, the reference speed value delivered by output 37 is lowered at a high rate of change, in the range of −80 to −130 m/s², and preferably −120 ms².

The apparatus 10 has four comparators 61, 62, 63 and 64, each assigned to one of the vehicle wheels 14, 16, 17, and 18. Each comparator 61 to 64 delivers a high level signal in its output if the reference speed, momentarily represented by the output signal of the reference signal generator 36, is larger than the circumferential speed of the wheel monitored by the respective comparator.

Thus, the characteristic signals for the circumferential speeds of the vehicle wheels 14, 16–18 which are suitable for cmparison with the output signal of the reference signal generator 36, are delivered to the outputs, which are not labeled in detail, of the antilocking control unit 12. With the falling edge of an output signal of a second four-input OR member 66, to which the output signals of the comparators 61 to 64 are routed as input signals, both flip flops 48 and 56 are reset to a low output signal level. The control signal, routed to the third control input 42 of the reference signal generator 36 thereby also falls with the fall of the output signal of the two input AND member 52.

In its first operational state, the "normal" operating state, the reference signal generator 36 is driven by the high level output signal of a third two input AND gate 67, which has a first negated input 68, which is connected to the output of the first two input AND gate, and a second negated input 69, which is connected to the output side of the time delay gate 59.

The reference signal generator 36 has the capability of changing the reference signal either continuously or incrementally in steps ranging from 10 km/h/25 ms to 16 km/h/25 ms.

Figure 2:
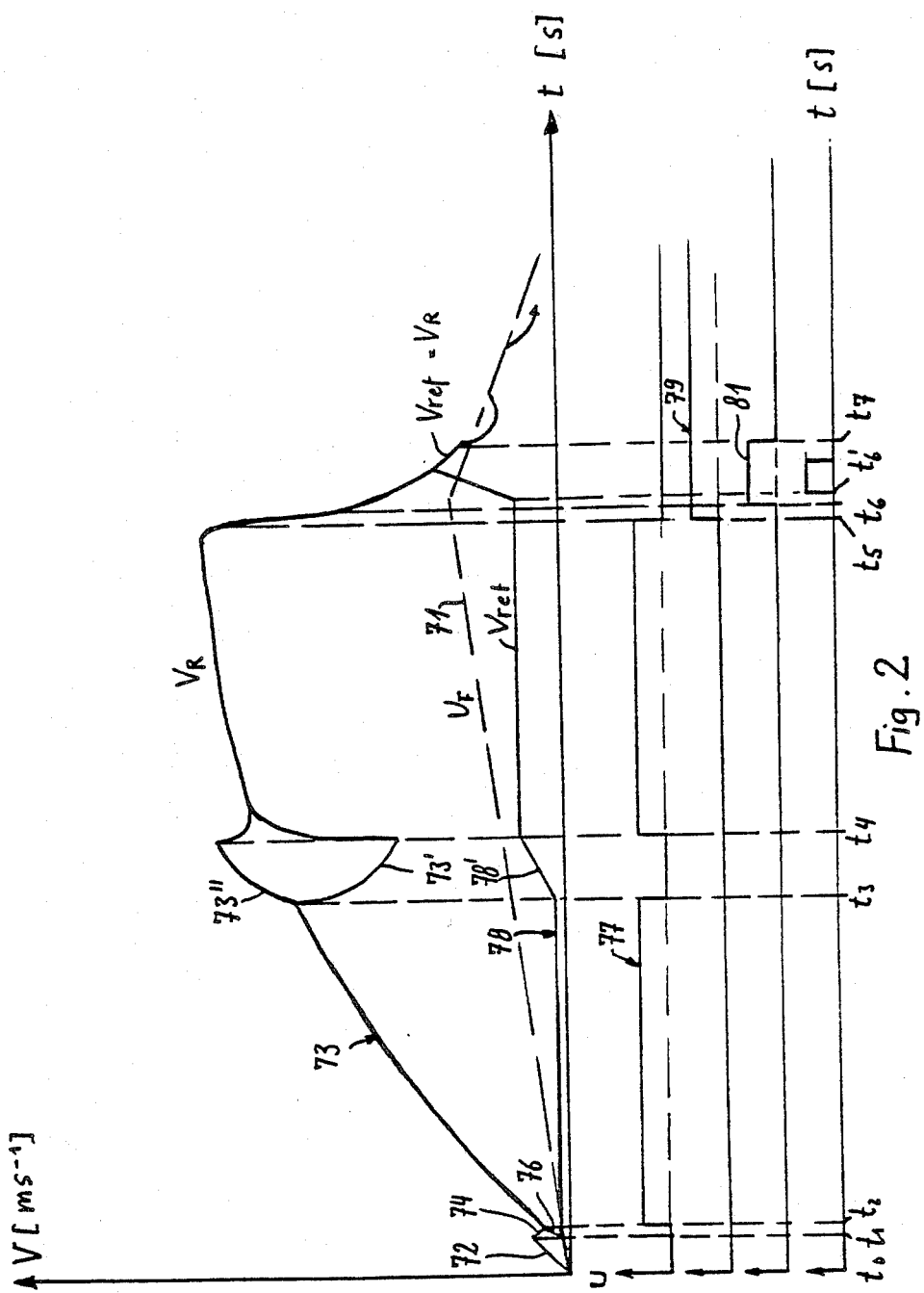
FIG. 2 is a diagram which illustrates the functioning of FIG. 1 when the vehicle starts on a hill and when there is a low frictional coefficient between the road and the driven vehicle wheels.

Reference is made to the diagram of FIG. 2 to help explain the typical operational properties of the apparatus 10 of the invention. The situation encountered when driving up a hill at low values of friction between the road and the driven vehicle wheels is explained through this diagram.

The vehicle is started at time $t_0$, and only the rear wheels 14 and 15 are driven at first. The vehicle starts to move with moderate acceleration of approximately 1 m/s², and the velocity $V_f$(vehicle speed) is represented by the chronologically linearly increasing broken line 71 in the V/t diagram of FIG. 2. The driven rear wheels 14 and 16 of vehicle 11 are accelerated much faster, as shown by the first curve section 72, which rises relatively steeply, of the upper speed curve 73.

Since the rear wheels 14 and 16 in this example, have the tendency to spin, at time $t_1$ the switch is made from one axle to two axle drive. The front wheels 17 and 18 are not driven at time $t_1$. As seen by the relatively short, falling section 74 of the speed curve 73 of the rear wheels, and the steeply rising section 76 of the speed curve of the front wheels 17 and 18, the speed of the vehicle wheels are more and more synchronized with one another within a short period of time. Therefore, even though the speed of the rear wheels 14 and 16 has decreased negligibly, in total the tendency to spin remains constant for the vehicle wheels, which are now all driven. At time $t_2$ the electronic all wheel control unit 13 delivers from its second control output 34 the control output signal, represented in the timing diagram as the first impulse 77 of FIG. 2. The longitudinal differential 27 of the vehicle 11 is locked by this control output signal.

It is assumed for the sake of simplicity that all of the vehicle wheels 14 and 16, as well as 17 and 18, starting from $t_2$, turn at the same speed, and their circumferential speed, according to the curve 73, increases much faster than the speed of the vehicle. Starting from time $t_2$, the first two input AND gate 44 also generates a logic high output signal, so that the reference speed, represented by the lower curve 78 in the V/t diagram of FIG. 2, is kept at that low value which was given at time $t_2$ and which corresponds to the lowest circumferential speed of the front wheels 17 and 18, which had not been driven until then.

At the time $t_3$, for example, 3 seconds after shifting the longitudinal differential into lock, a test cycle is started by the all wheel drive control unit 13. This switches operation back to a one axle drive. The test cycle lasts until time $t_4$, approximately 50 msec to 100 msec. Within the test cycle the wheel circumferential speed of the front wheels, which once again are driven, falls, as is evident from the falling branch 73' of the curve. The actual vehicle speed, however, is not taken into consideration. The circumferential speed of the rear wheels 14 and 16 which alone are being driven during the test cycle, increases a is evident from the rising branch 73" of the curve 73. As long as the test cycle continues, the reference speed V ref, in accordance with the rising section 78' of the $V_{ref}$/t curve 78, increases at a rate of 4 m/s² because the wheel speed is higher than the reference speed V ref. At time $t_4$ the switch is made again to all wheel drive upon shifting to locking of the longitudinal differential, whereupon the reference speed V ref is once again held constant at the value obtained at time $t_4$.

It is assumed that the circumferential speeds of the driven rear and front wheels 14 and 16 or 17 and 18 attain again the same values after switching to all wheel drive, having locked the longitudinal differential, and rise moderately according to the course of the V/t curve 73.

Deceleration, initiated at time $t_5$ is indicated in FIG. 2 by the output signal 79 for the brake light switch. Deceleration results at time $t_6$ in the fact that for at least one of the decelerated vehicle wheels the (−b) signal 81 is triggered, which indicates that at this vehicle wheel a critical threshold value of the wheel deceleration has been exceeded and the antilocking control system is activated. At the start of control, this does not result in a decrease in pressure in the wheel brake of this extremely decelerated wheel, but rather the brake pressure control valve of this wheel is controlled to hold pressure. Not until the wheel speed has dropped for example to 4 km/h at a later time $t_6'$, after (−b) signal 81 begins, is the brake pressure control valve of this wheel switched to pressure decrease. The wheel, however, is still decelerated because the vehicle speed is less than the wheel speed. Following the start of the control when the pressure is decreased, that is after $t_6$, the reference speed, having a high rate of change of, for example, 25 m/s², is matched to the wheel speed of the non-decelerated wheel. With the fall of the (−b) signal 81, the brakes are re-activated to cause too high a brake slip. Starting at time $t_7$, when the signal falls for the first time, other control cycles of the antilocking control system are carried out as predetermined by the design of the antilocking control unit 12.

Figure 3:
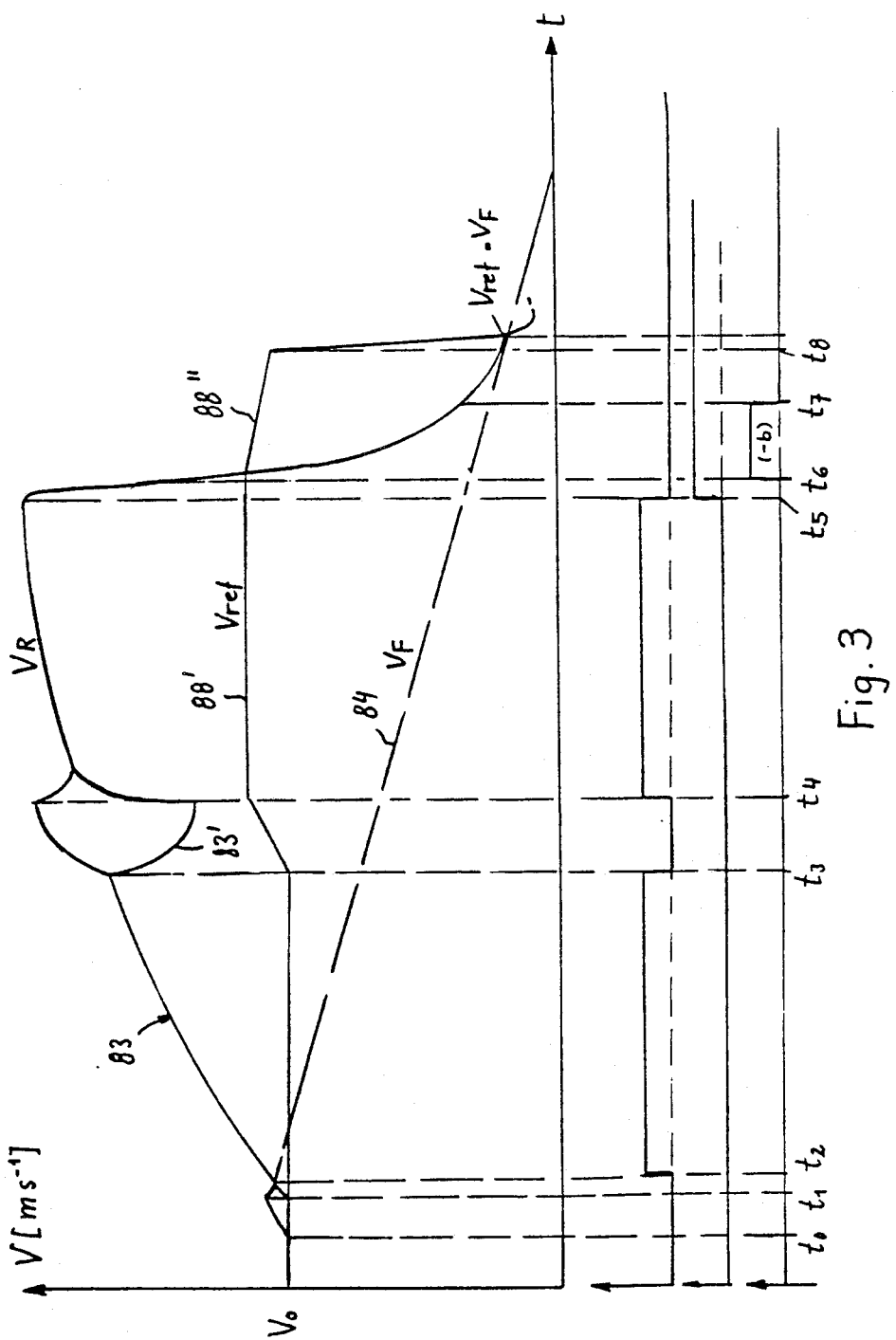
FIG. 3 shows a diagram, corresponding to the view of FIG. 2, further illustrating the braking action during which the antilocking control system is effective.

The diagram shown in FIG. 3, similar to FIG. 2, shows a situation in which a vehicle 11, having all wheel drive and anti-locking systems, as explained above, moves out of a driving situation with uniform, relatively high velocity $V_0$ into an uphill driving situation. Once again it is assumed that there is a negligible frictional value between the road and the vehicle wheels. It is also assumed, as in the case of FIG. 2, that the wheels of a vehicle axle have the same motion characteristics.

At time $t_0$, the driven rear wheels begin to turn faster than the front wheels. Therefore, at time $t_1$ the switch is made to all wheel drive and at time $t_2$ the longitudinal differential is locked. Even though all the vehicle wheels, as shown by the V/t curve 83, continue to accelerate, the vehicle speed $V_f$ represented by a broken falling line 84, decreases due to the uphill situation. Nevertheless, in a test cycle $t_3$ to $t_4$, conducted as described for FIG. 2, the reference speed is increased at a rate of 4 m/s$^2$, which is predetermined by the design of the control unit 12 of the antilocking system. This is because the wheel speeds of the front wheels, represented by the falling branch 83' of the curve, do not fall far enough, and following the shift again to all wheel drive, are kept constant at the value of the reference speed obtained at time $t_4$, and whose value is represented by the curve 88. At time $t_5$, the driver activates the brake, whereupon the high level output signal of the first AND gate 44 falls to a logic 0 and the first flip flop 48 is set at a high output level. Due to the low effective frictional value, the vehicle wheels can be delayed for a long time through deceleration so that at time $t_6$ the $(-b)$ signal of the antilocking control unit 12 of the antilocking system occurs. Starting at time $t_5$, the reference signal generator 36 is placed into its first operational state in which, depending on the design of the antilocking control unit 12 of the antilocking system, the reference speed is lowered at a rate of $-3$ m/s$^2$, as shown by the falling section 88" of the reference speed curve.

After the vehicle wheels have been decelerated far below the reference speed, the $(-b)$ signal 86 falls at time $t_7$. With the falling edge 87 of the $(-b)$ signal, the second flip flop 56 is also set at a high output signal level and the AND gate 52 generates a logic 1 signal which, following the delay in increase of approximately 100 ms, determined by the time delay gate 59, controls the reference signal generator 36 into its third operational state at time $t_8$. In this state, the reference speed is lowered at a high rate of change of approximately 120 to 130 m/s$^2$. In the interim between $t_7$ and, due to the great difference between the reference speed and the wheel speeds, the generated brake slip signals, which combined with the $(-b)$ signal 86 have resulted in the fact that the antilocking control system has responded to decrease the pressure in the wheel brakes, fall during this delay time span so that starting at time $t_8$, the brake pressure can once again be built up in the wheel brakes.

As soon as the reference speed has fallen to the value of the wheel speeds, the output signal of the OR member 66 falls and both flip flops 48 and 46 are reset again with the result that the reference signal generator is again controlled into its first operational state in which the antilocking control is determined by the design of the antilocking control unit 12.

The vehicle can also be quickly decelerated in the example explained with the aid of FIG. 3. Extreme situations are represented by both operating situations shown by FIGS. 2 and 3, "between" which lie the other possible road situations of a vehicle which has automatic all wheel drive and antilocking systems, which can also be overcome with certainty by the apparatus 10 constructed in accordance with a preferred embodiment of the present invention.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A process for generating a reference signal representing the speed of a vehicle, said vehicle having selectable automatic on- and off all wheel drive with wheel sensors, each of which delivers wheel speed signals in proportion to the speed, with an antilocking control system; having a first electronic control unit that evaluates the wheel speed signals and delivers control signals for decreasing, keeping constant or increasing brake pressure, with an all wheel drive control apparatus; having a second electronic control unit that evaluates the wheel speed signals and:
   (1) switches to two axle drive if at least one of the wheels of a permanently driven axle spins,
   (2) in the case of continuous spinning of at least one wheel of the two axles, locks a longitudinal differential in the power train between front and rear axles;

the reference signal of the vehicle speed being generated from the wheel speed signals of non-driven wheels, provided only one axle is driven and the reference signal is routed to both control units; said process including:
   (a) increasing the reference signal of the vehicle speed at a rate of change, limited by a predetermined acceleration threshold value of approximately 4 m/s$^2$, if both axles are drive-coupled via the longitudinal differential and the wheel speed signals change with a value that exceeds said threshold value;
   (b) restricting the reference signal of the vehicle speed to a maximum value present during the locking of the longitudinal differential;
   (c) increasing the reference signal at a rate of change of 4 m/s$^2$ if a test cycle, which periodically uncouples an axle from the power train, yields that the largest wheel speed signal is higher than the reference signal; and
   (d) reducing the reference signal at a high rate of change down to the largest wheel speed signal if the reference signal, generated according to steps (a) to (c), is greater than the largest wheel speed signal.

2. The process of claim 1, wherein during deceleration provided by the antilocking control system, following the fall of a characteristic output signal of the antilocking system electronic control unit for a minimum deceleration of the decelerated vehicle wheel, and after a delay time span within which the vehicle wheels attain operating speed, the reference signal is matched to the wheel speed signal.

3. The process of claim 2, wherein the delay time is predetermined within a range of values from 80 ms to 200 ms.

4. The process of claim 3, wherein the delay time is 100 ms.

5. The process of claim 2, wherein the reference speed is matched to the largest wheel speed signal present following the delay time span, at a rate of change which corresponds to a deceleration of at least $-80$ m/s$^2$.

6. The process of claim 5, wherein the rate of change is 120 m/s$^2$.

7. The process of claim 5, wherein the reference signal is changed incrementally in steps, ranging from 10 km/h/25 ms to 16 km/h/25 ms.

8. The process of claim 5, wherein switching on the longitudinal differential triggers a step-by-step lowering of the reference signal from a momentary value given when switching on.

9. The process of claim 8, wherein the average rate of step-by-step lowering is 2 m/s$^2$.

10. Apparatus for providing a reference signal to an antilocking control system in an automatic all wheel drive vehicle, comprising:
- a reference signal generator means, which can be driven by output signals of electronic control units of the antilocking system and the automatic all wheel drive, said reference signal generator means delivering from a reference signal output, a reference signal which corresponds to the reference speed, as long as the power train of the vehicle is shifted to one axle drive;
- a logical switching circuit, provided to drive said reference signal generator means, said circuit including a first AND gate having a first input for receiving a high level signal when a brake is activated, and a second input for receiving an output signal of the automatic all wheel drive control unit, and providing a high output signal indicating that the all wheel drive and a longitudinal differential lock are switched on;
- wherein for a duration of a high output signal of the AND gate, the reference signal generator means is driven by said AND gate to deliver a reference speed signal which decreases at a first preselected rate of change, and after a delay time span, following a fall of a signal from the electronic control unit of the antilocking system, the reference signal generator means generates reference speed output signals which decrease at a second rate of change higher than said first rate of change.

11. The apparatus of claim 10, including comparator means connected to the output signal of the reference signal generator means for delivering a high level signal as soon as a circumferential speed of one of the vehicle wheels is smaller than the reference signal.

12. The apparatus of claim 11, including a first flip flop that is set at a high output signal level with a falling edge of the high output signal of the first AND gate, said first flip flop being resettable at a low output signal level by the falling edge of the high level signal of the comparator;
- a second flip flop that is set at a high output signal level with the falling edge of the output signal of an OR member, to which are routed signals of the electronic control unit of the antilocking system which are generated for one or more vehicle wheels as high level input signals, said second flip flop being resettable to a low output signal level by the falling edge of the high level signal of the comparator;
- wherein output signals of both flip flops are routed as input signals to a second two input AND gate whose output signal is routed via a time delay member 4252 whereby for a duration of a high level signal of the time delay member, the reference signal generator is driven to lower the reference speed at a high rate of change.

13. A process for generating a reference signal representing a vehicle speed of a vehicle, said vehicle having an automatic selectable all wheel drive including a lockable longitudinal differential; an antilocking control system; and wheel sensors for detecting circumferential wheel speeds and producing wheel speed signals corresponding to said detected wheel speeds, said process including the steps of:
(a) increasing the reference signal at a rate limited by a predetermined threshold rate if both axles are drive coupled via the longitudinal differential and a wheel speed signal increases faster than the threshold rate.

14. The process of claim 13, including the step:
(b) keeping the reference signal at a maximum value attained by the reference signal during a process of locking the longitudinal differential.

15. The process of claim 14, including the step:
(c) periodically uncoupling an axle from a power train of the vehicle for a test cycle; and increasing the reference signal at a predetermined test cycle rate if the largest of the wheel speed signals is greater than the reference signal.

16. The process of claim 15, including the step:
(d) reducing the reference signal down to the largest wheel speed signal if the reference signal is greater than the largest speed signal.

17. An arrangement for generating and providing a reference signal representing an estimated vehicle speed in a vehicle having selectable automatic all wheel drive and an antilocking control system, comprising:
- means for detecting circumferential speeds of each vehicle wheel;
- all wheel drive control means for placing the vehicle in an all wheel drive mode and for locking a longitudinal differential;
- antilocking control means for controlling operation of the antilocking system;
- and reference signal generating means for producing said reference signal, connected to both said all wheel drive control means and said antilocking controls means;
- first operational state control means for controlling said reference signal generating means to produce a reference signal that either increases or decreases to match increases and decreases in the detected circumferential speeds of non-driven wheels when said vehicle is being driven by a single axle only;
- second operational state control means for controlling said reference signal generating means to produce a reference signal that is either held constant at a highest value of the reference signal attained during transition of said reference signal generating means from first to second operational state, or is gradually lowered, in response to locking of the longitudinal differential in combination with nonactivation of a vehicle brake; and
- third operational state means for controlling said reference signal generating means to lower the reference signal produced when said reference signal is larger than the largest of the detected circumferential wheel speeds.

* * * * *